United States Patent [19]
Obitts

[11] Patent Number: 6,079,894
[45] Date of Patent: Jun. 27, 2000

[54] INTEGRAL SNAP BUTTON AND ANTI-RATTLE MEMBER

[75] Inventor: Shane Obitts, Elyria, Ohio

[73] Assignee: Invacare Corporation, Elyria, Ohio

[21] Appl. No.: 09/121,086

[22] Filed: Jul. 23, 1998

Related U.S. Application Data

[63] Continuation-in-part of application No. 08/662,453, Jun. 13, 1996, abandoned.

[51] Int. Cl.[7] .......................................................... F16B 7/10
[52] U.S. Cl. ................................... 403/109.3; 403/109.2; 135/75
[58] Field of Search ..................................... 403/377, 378, 403/108, 104, 110, 106, 107, 109.1, 109.2, 109.3, 379.6; 135/75, 141, 142, 69, 65, 25.1; 248/188.5

[56] References Cited

U.S. PATENT DOCUMENTS

| | | |
|---|---|---|
| 1,007,322 | 10/1911 | Barnes . |
| 2,221,288 | 11/1940 | Okun . |
| 2,794,633 | 6/1957 | Delaney . |
| 2,811,978 | 11/1957 | Russell . |
| 2,980,456 | 4/1961 | McMullin . |
| 3,811,455 | 5/1974 | Thur . |
| 3,886,962 | 6/1975 | Diamonds . |
| 4,029,279 | 6/1977 | Nakatani . |
| 4,044,784 | 8/1977 | Smith . |
| 4,047,821 | 9/1977 | Hoke et al. . |
| 4,079,978 | 3/1978 | McMullin . |
| 4,085,763 | 4/1978 | Thomas . |
| 4,385,849 | 5/1983 | Crain . |
| 4,466,377 | 8/1984 | Kolb et al. . |
| 4,528,998 | 7/1985 | Gamm . |
| 4,596,484 | 6/1986 | Nakatani . |
| 4,711,595 | 12/1987 | Magid et al. . |
| 4,809,725 | 3/1989 | Champigny . |
| 4,818,135 | 4/1989 | DesJardins . |
| 4,830,035 | 5/1989 | Liu . |
| 4,865,065 | 9/1989 | Chen . |
| 5,139,040 | 8/1992 | Kelly . |
| 5,186,197 | 2/1993 | Lavine . |
| 5,375,938 | 12/1994 | Bartlow . |
| 5,387,048 | 2/1995 | Kuo . |
| 5,542,773 | 8/1996 | Tu . |

FOREIGN PATENT DOCUMENTS

| | | |
|---|---|---|
| 145096 | 6/1985 | European Pat. Off. . |
| 0 812 992 | 12/1997 | European Pat. Off. . |
| 1121346 | 8/1956 | France . |
| 2662498 | 11/1991 | France . |
| 563211 | 5/1957 | Italy . |
| 574887 | 1/1946 | United Kingdom . |

*Primary Examiner*—Harry C. Kim
*Attorney, Agent, or Firm*—Hudak & Shunk Co., L.P.A.

[57] ABSTRACT

An integral snap button and anti-rattle member is provided for locking the length of and decreasing the play and rattle between inner and outer tubes of an adjustable-length telescoping tube assembly. The member fits into the inner and outer tubes and a button formed thereon passes through an opening in the inner tube and one of a plurality of openings in the outer tube to adjustably lock the length of the assembly. A collar formed on the member fits within the outer telescoping tube to decrease play and rattle between the tubes of the assembly. The member is easily manufactured as an integral or one-piece member and is easily installed in the assembly.

33 Claims, 4 Drawing Sheets

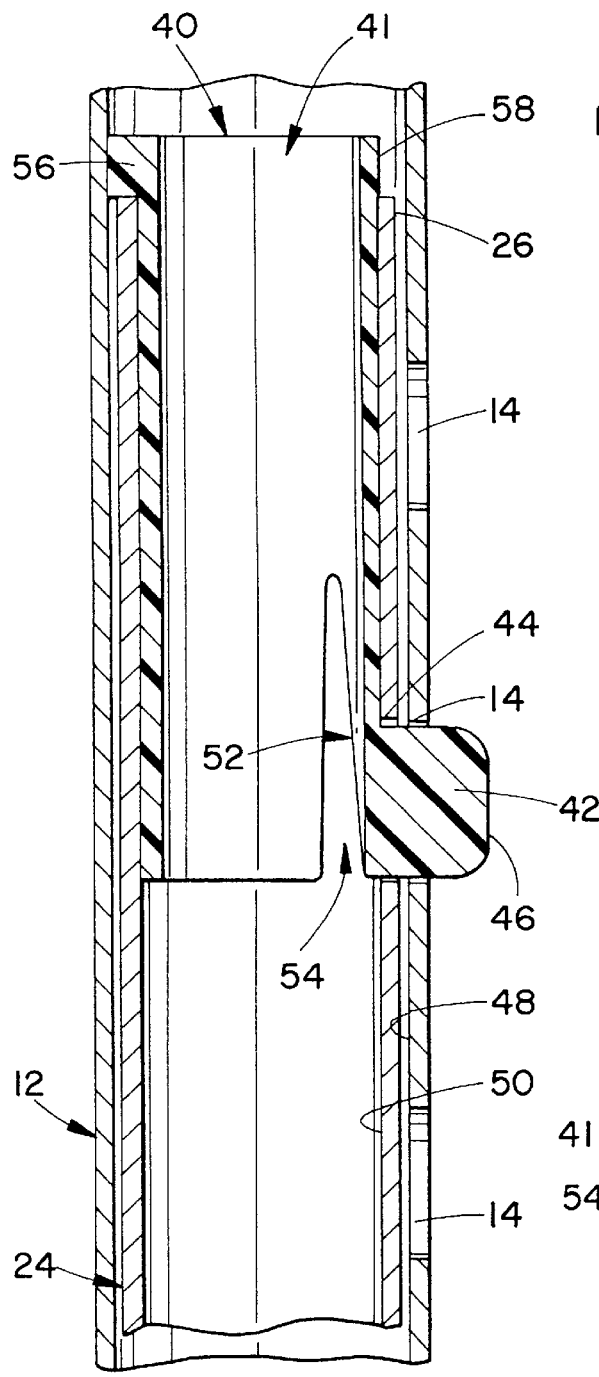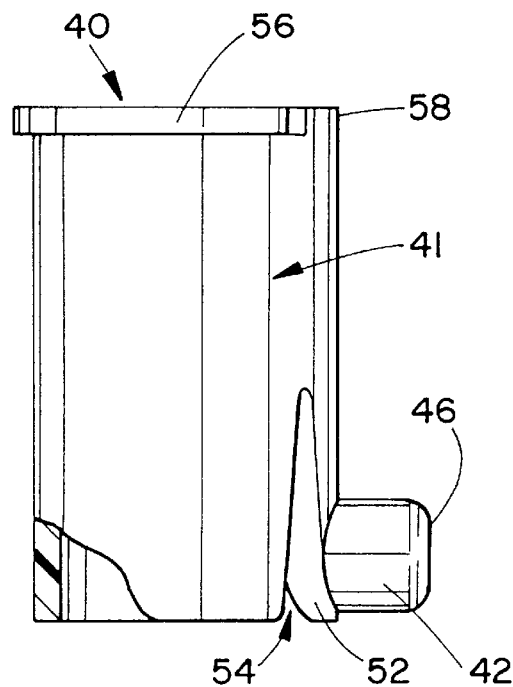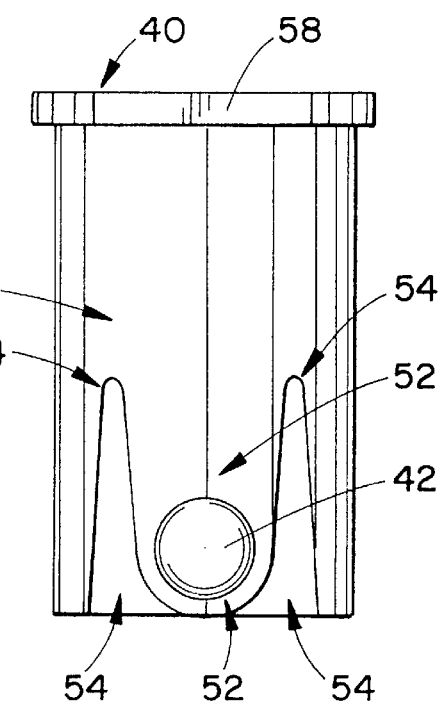

INTEGRAL SNAP BUTTON AND ANTI-RATTLE MEMBER

CROSS REFERENCE

This is a continuation-in-part of application Ser. No. 08/662,453, filed Jun. 13, 1996 now abandoned.

BACKGROUND OF THE INVENTION

The present invention pertains to the art of adjustable-length telescoping tubes and more particularly to the locking mechanism therein.

The invention is particularly applicable to the adjustable-length canes, crutches, walkers, and the like and will be described with particular reference thereto. However, it will be appreciated that the invention has broader applications such as adjustable height chairs and commodes and may be advantageously employed in other environments and applications.

Adjustable-length tubes are typically composed of at least two telescoping, hollow, sleeves or tubes. The basic assembly comprises a first or inner tube slidably inserted in a second or outer tube. The inner tube has a sidewall opening while the outer tube has a series of openings spaced lengthwise along its sidewall. A spring-loaded button, or snap button as it is commonly referred to, is positioned in the interior of the inner tube. The button is dimensioned to protrude through the sidewall opening in the inner tube and outwardly through one of the openings in the outer tube.

A spring element, typically a U-shaped wire, is secured to the back of the button. One prong of the wire is attached to the button and the other prong extends to the opposite side of the inner tube sidewall. The wire urges the button through the opening in the inner tube sidewall. Since the button also protrudes through one of the openings in the outer tube sidewall, the tubes are locked relative to one another, thus locking the length of the telescoping tube assembly. U.S. Pat. Nos. 4,044,784; 4,528,998; and 5,139,040 generally show and describe this type of snap button assembly.

To adjust the length of the assembly, the spring-loaded button is pushed against the biasing force of the spring element through the outer tube opening toward the inner tube. Once the snap button clears the interior surface of the outer tube, the tubes are free to slide lengthwise relative to one another. The outer tube is then moved to a desired position relative to the inner tube, and the button aligned with a selected opening in the outer tube to achieve the desired axial length of the tube assembly.

One problem with prior art arrangements is that the snap button could be inadvertently moved from its registration with the opening in the inner tube if excessive force is imposed on the snap button. The outer surface of the button can potentially pass beneath the sidewall of the inner tube, allowing the snap button to become dislodged therein. Returning the button to the inner tube opening, unfortunately, requires disassembly to access and reposition the spring button in the inner tube.

Some adjustable-length tube assemblies have devices which decrease the play and rattle between the tubes of the assembly. For example, U.S. Pat. No. 4,085,763 addresses this problem in a cane by employing an annular stabilizing collar. The collar is slidably received over the inner tube and held in place with a wing-type male set screw. By tightening down the set screw, the outer tube is stabilized relative to the inner tube.

In U.S. Pat. No. 4,044,784, a swivel lock is used to fix an outer tube with respect to an inner tube. The swivel lock includes a sleeve in threaded engagement with an externally threaded portion on one end of the outer tube. The sleeve fits closely about the exterior surface of the inner tube to limit movement of the outer tube.

U.S. Pat. Nos. 4,596,484 and 4,029,279 show stabilizing arrangements using a lever type device. However, the locking mechanisms of these devices add additional weight, are fairly complex and difficult to use.

In the above patents, the anti-rattle mechanism is separate from the snap button. This requires additional manufacturing and assembly steps which add significantly to the cost thereof.

Therefore, it has been deemed desirable to develop an integral snap button and anti-rattle member for use in adjustable tube assemblies. The member provides easy adjustment of the length of the tubes, a high degree of stability, and is simple and economical to manufacture.

SUMMARY OF THE INVENTION

The present invention contemplates a new and improved integral snap button and anti-rattle member for use with an adjustable tube assembly that overcomes all of the above noted problems and others, is easily locked and unlocked, minimizes rattle when in use, and is simple and economical to manufacture and install.

In accordance with the present invention, an integral snap button and anti-rattle member includes a generally tubular body having a collar at one end and a flexible tab at the other end carrying a button thereon. The flexible tab provides a spring bias to the button when received in the tube assembly. The member is adapted for receipt in one end of an inner tube with the button protruding radially outward therefrom. The outer tube slides over the collar and button of the member. The outer tube is slid to a desired position along the inner tube and the button is aligned with the nearest opening in the outer tube sidewall. The biasing force of the flexible tab urges the button through the opening in the outer tube, thus locking the relative positions of the tubes. The collar contacts the interior of the outer tube to limit any play and rattle between the tubes.

Further, in accordance with the invention, the integral antirattle/snap button member has a pair of spaced apart cutouts on either side of the tab allowing flexing movement of the tab and providing a returning force to the button after the button is depressed.

In accordance with a second embodiment of the invention, the member comprises a spring to bias the flexible tab through the opening in the outer tube.

In accordance with still another embodiment of the present invention, an integral snap button and anti-rattle member includes a resilient generally oval-shaped continuous loop formed with a button, the loop being interconnected with an anti-rattle collar. The resilient continuous loop provides a spring bias to the button when received in the tube assembly.

Preferably, in accordance with the invention, the integral member is formed of plastic.

Still further, in accordance with the invention, a metal cap is provided that fits over the button.

A principal advantage of the invention is the unification of the snap button and the anti-rattle member into one member thereby eliminating inventory, and manufacturing and assembly steps.

Another advantage of the invention resides in the ease with which the integral snap button is positioned and retained in the assembly.

Still other advantages and benefits of the invention will become apparent to those skilled in the art upon a reading and understanding of the following detailed description.

BRIEF DESCRIPTION OF THE DRAWINGS

The invention may take physical form in certain parts and arrangements of parts, preferred embodiments of which will be described in detail in this specification and illustrated in the accompanying drawings which form a part hereof, and wherein:

FIG. 2 is a longitudinal cross-sectional view of the integral button and anti-rattle member of the subject invention mounted in a telescoping tube assembly;

FIG. 3 is an elevational view of the integral button and anti-rattle member of the subject invention;

FIG. 4 is an elevational view of the integral button and anti-rattle member taken generally from the right-hand side of FIG. 3;

DETAILED DESCRIPTION OF THE PREFERRED EMBODIMENTS

Figure 1:
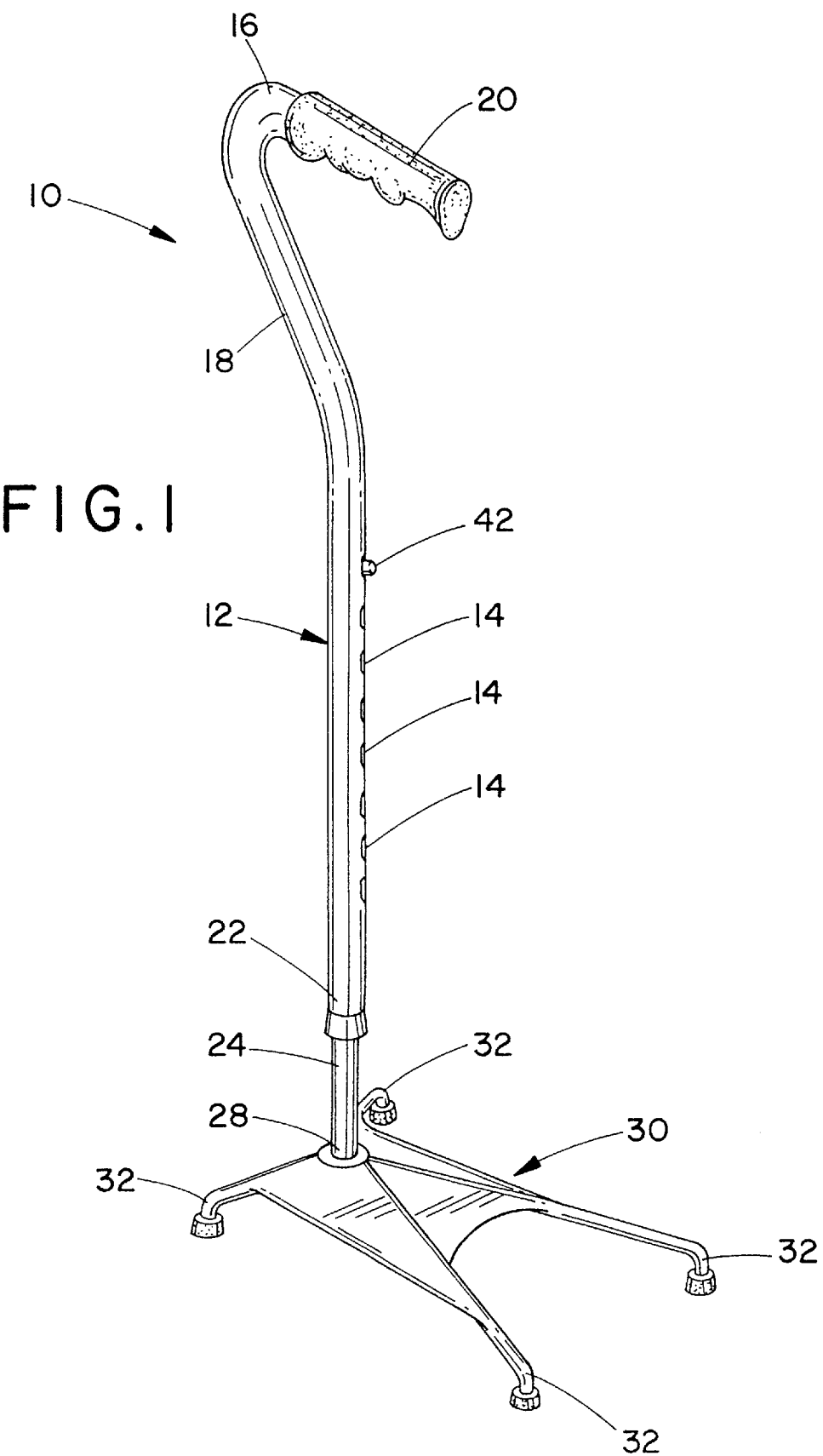
FIG. 1 is a perspective view of an adjustable-length cane using the subject invention.

Referring now to the drawings wherein the showings are for purposes of illustrating the preferred embodiments of the invention only and not for purposes of limiting same, FIG. 1 shows an adjustable-length cane 10 having a first or outer hollow tube 12 with a plurality of longitudinally or axially spaced openings 14. In the environment of FIG. 1, the first tube 12 is integrally formed or bent into a generally horizontally extending handle 16 at a first or upper end 18. A hand grip 20 is typically received over the upper end 18 and is configured to comfortably receive a user's hand in gripping relation. A second or lower end 22 of the outer tube 12 is open ended and adapted to receive in telescoping relation a second or hollow inner tube 24. According to the preferred embodiment, the inner tube 24 is open at a first or upper end 26 (FIG. 2) and a second or lower end 28 is mounted or secured to a base 30. The base 30 has four spaced legs 32 defining an enlarged footprint that provides a stable configuration.

More particularly, FIG. 2 illustrates the outer and inner tubes 12, 24 and an integral snap button and anti-rattle member 40 of the present invention. The member 40 preferably comprises a generally cylindrical, open ended body 41 that is frictionally fit within the inner tube. A button 42 extends generally radially outward from the body. The button 42 protrudes through an opening 44 in the inner tube 24 and through one of the plurality of openings 14 in the outer tube to hold the outer and inner tubes 12, 24 in locked relation to one another. Preferably, the button 42 has a curved face 46 so that as the button is manually depressed radially inward through one of the openings 14, the curved face of the button easily passes beneath an interior surface 48 of the outer tube 12. Then, when the inner tube 24 is pushed or pulled in a lengthwise direction relative to the outer tube 12, the curved face of the button, when depressed, easily slides beneath an interior surface 48 of the outer tube 12 until another of the plurality of openings 14 is aligned with the button.

To prevent excessive depression of the button, the dimensions of the openings 14, 44 in the outer and inner tubes, respectively, and of the button 42 are selected so that a user's finger cannot push the face 46 of the button 42 beneath an interior surface 50 of the inner tube 24. Moreover, the frictional fit between the snap button/anti-rattle member and the inner tube maintains proper alignment between the button and the inner tube opening even if the button is depressed beneath the interior surface of the inner tube. It will be appreciated that other means of preventing the dislodging of the integral member 40 relative to the inner tube 24 may include a stop (not shown) located in the path of the inwardly flexing button 42 to limit inward depression thereof.

Referring to FIGS. 3 and 4, the button 42 is preferably integrally formed on a flexible portion or tab 52 of the body 41. The tab 52 is partially separated from the remainder of the body by a pair of longitudinal slits or cutouts 54. The cutouts allow the tab to flex radially inward when manual depression force is exerted on the button to adjust the cane length. The outward biasing force of the flexible tab 52 then urges the button 42 outwardly through the desired one of the plural openings 14.

A collar 56 is formed on one end of the body 41. The collar 56 has an outer peripheral dimension slightly greater than an outer peripheral dimension of the inner tube 24 and generally equal to the inner peripheral dimension of the outer tube 12. The collar thus engages or abuts the interior surface 48 of the outer tube 12. Thus, the frictional engagement between the body 41 and the inner tube, in conjunction with the engagement between the collar and the outer tube, eliminates excessive play or rattle between the telescoping tubes.

The collar 56 may be discontinued along a peripheral portion to form an indentation or a gap 58 preferably at a region longitudinally overlying the button 42. This allows the length of the flexible tab 52 to lie generally flush with the interior surface 50 of the inner tube 24. The indentation or gap 58 may range from complete discontinuity of the collar to only a depression in the general peripheral dimension of the collar 56. The purpose of the indentation or gap is to increase the stability of the tab 52 and button 42, and ensure maximal protrusion of the button 42 through the opening 44 in the inner tube 24.

Figure 5:
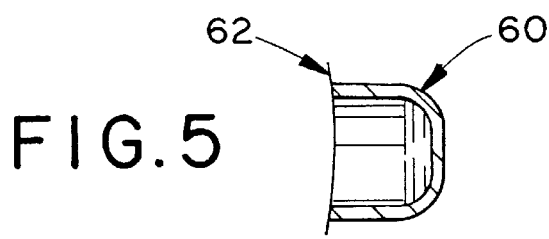
FIG. 5 illustrates a metal cap that is placed over the button.

FIG. 5 shows a metal cap 60 that can be positioned over the button to increase its strength. Since the button is exposed to shearing forces from contact with the inner and outer tubes, the metal cap 60 is placed over the button to limit the adverse effect of these forces on the button. The metal cap is secured to the button, for example, with an adhesive. The metal cap 60 can also be provided with a lower rim or lip 62 that limits outward extension of the cap through the inner tube opening 44.

Figure 6:
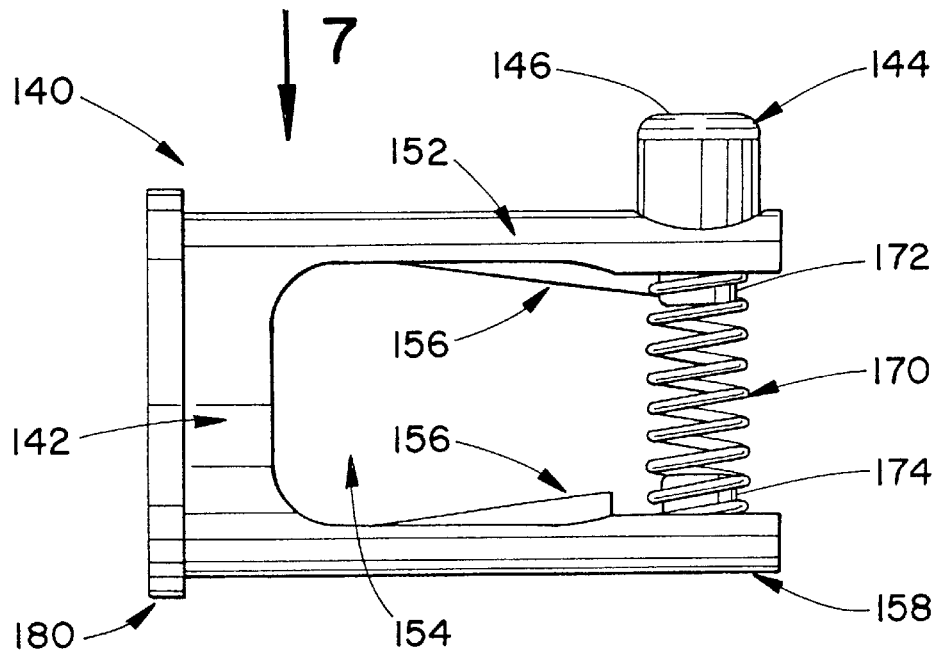
FIG. 6 is an elevational view of a second embodiment of the integral button and anti-rattle member.
Figure 7:
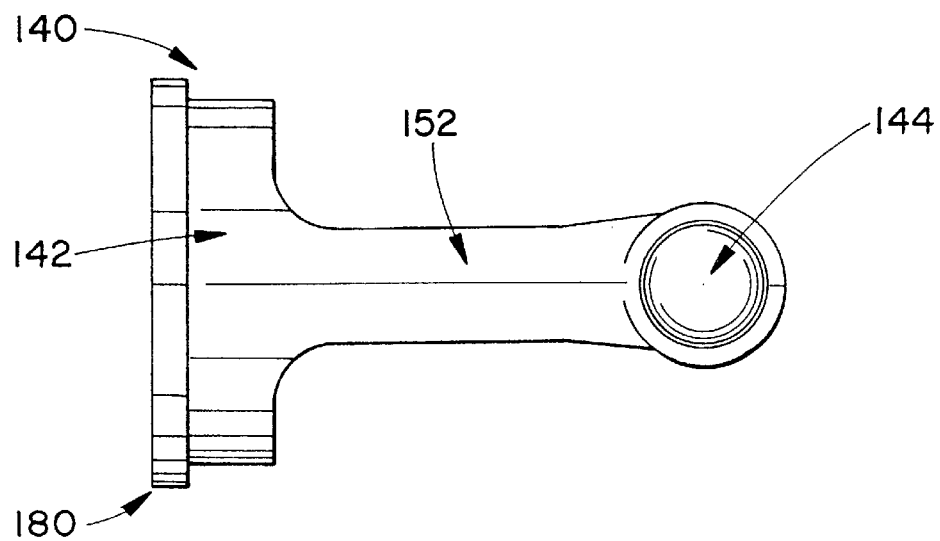
FIG. 7 is an elevational view of the second embodiment of the integral button and anti-rattle element taken generally in the direction of arrow 7 in FIG. 6.

FIGS. 6 and 7 illustrate a second preferred embodiment of the integral button and anti-rattle member for use in outer and inner hollow tubes 12, 24 such as shown in FIGS. 1 and 2. Referring to FIG. 6, the integral member 140 comprises a body 142 and a button 144. Similar to the integral member of the first preferred embodiment, the button protrudes through openings in the inner and outer tubes to hold them in locked relation to one another. The button has a curved face 146 to allow the face to easily pass beneath an interior surface 48 of the outer tube.

In the arrangement of FIG. 6, the button is integrally formed on a flexible portion or first tab 152 of the body 142. The first tab is partially separated from the remainder of the body by a pair of enlarged cutouts 154. The cutouts allow the first tab 152 to flex radially inward when a manual depression force is exerted on the button 144. The first tab is strengthened by means of a wedge-shaped ridge 156 formed on an interior surface of the first tab 152. Opposite the first tab 152 on the body 142 is a second tab 158. The second tab 158 is also strengthened by a wedge-shaped ridge 156 formed on an interior surface of the second tab.

A helical spring 170 extends between the first and second tabs. An end of spring 170 is stabilized against the first tab by a first nub or projection 172 which preferably lies opposite the button on the first tab. The first nub 172 extends into the spring a predetermined distance to prevent the spring from dislodging. Similarly, the other end of spring 170 is stabilized against the second tab by a second nub 174 which extends into the spring. Other means of attaching the spring 170 to the first and second tabs 152, 158 can be used without departing from the scope and intent of the subject invention.

A collar 180 is defined on one end of the body 142. The collar 180 has an outer peripheral dimension slightly greater than an outer peripheral dimension of the inner tube 24 of FIG. 2 and generally equal to the inner peripheral dimension of the outer tube 12. The collar 180 thus abuts the interior surface 48 of the outer tube 12 in a close fitting relation. This allows the inner and outer tubes to slide relative to one another and also serves the anti-rattle purpose described above.

It is understood that a third nub (not shown) optionally can be formed on an exterior surface of second tab 1 58 opposite second nub 174. This third nub has a width less than or equal to the width of the wall of inner tube 24, and engages an opening (not shown) formed in the inner tube generally opposite button opening 44. More particularly, the third nub provides additional stability to snap button/anti-rattle member 140 within inner tube 24, and more specifically provides an added measure of protection against dislodging of the member from the inner tube such as when outer tube 12 is abruptly removed completely from inner tube during length adjustment.

Still another optional design feature which can be incorporated into snap button/anti-rattle member 140 of the second embodiment of the present invention, is to form collar 180 with a small cutout, indentation, depression, or the like (not shown). Such a cutout would prove useful during assembly of cane 10 if snap button/anti-rattle member 140 were incorrectly fitted or seated in inner tube 24. Due to the tight friction fit between tabs 152, 158, and interior surface 50 of inner tube 24, it may be relatively difficult and inconvenient during the assembly procedure to dislodge and reseat member 140 within the inner tube.

Formation of the cutout in collar 180 enables a special tool such as a thin wire hook or the like to be inserted through the cutout to engage body 142 to facilitate pulling of member 140 out of inner tube 24 for subsequent proper reseating therein.

Figure 8:
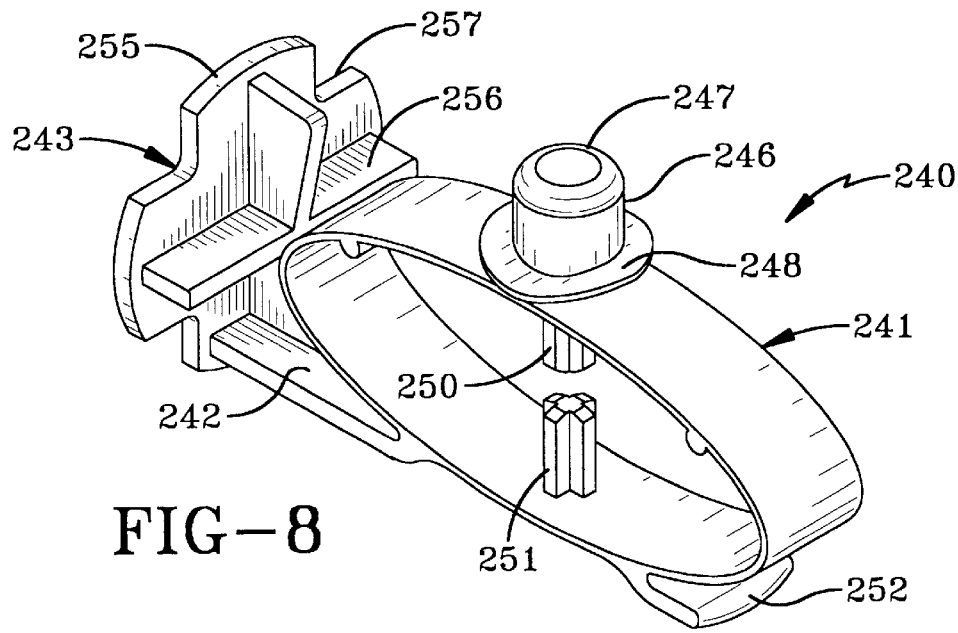
FIG. 8 is a perspective view of a third embodiment of the integral button and anti-rattle member of the present invention.
Figures 9, 10:
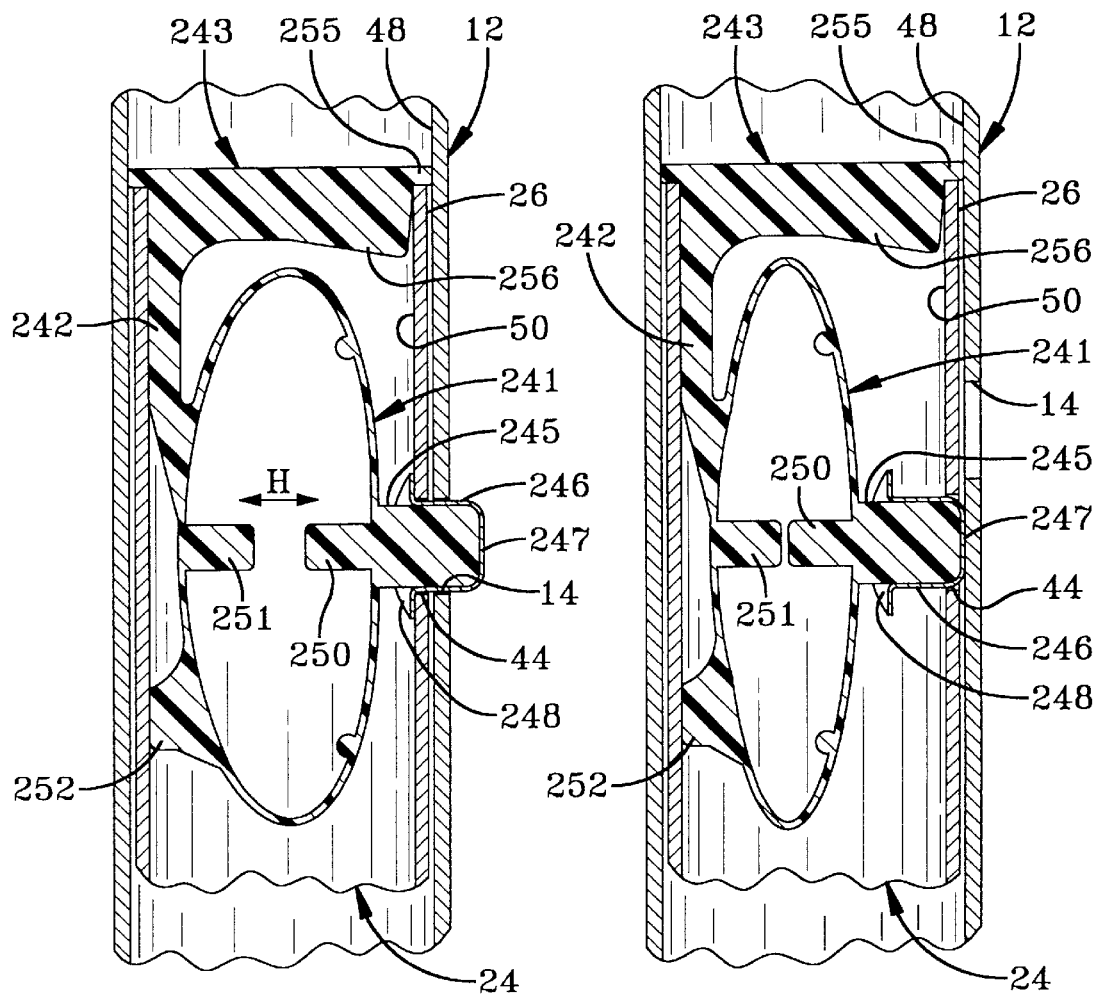
FIG. 9 is a longitudinal cross-sectional view of the integral button and anti-rattle member of the third embodiment of the invention mounted in a telescoping tube assembly and locking the telescoping tubes at a selected length.
FIG. 10 is a view similar to FIG. 9, but illustrating the retracted position of the integral button and anti-rattle member in the telescoping tubes during length adjustment of the tubes.

A third preferred embodiment of the integral snap button/anti-rattle member of the present invention is shown in FIG. 8 and indicated generally at 240, and is intended for use in outer and inner telescoping hollow tubes 12, 24, respectively, as illustrated in FIGS. 9 and 10. Snap button/anti-rattle member 240 comprises a resilient generally oval-shaped continuous loop 241 integrally connected to a collar 243 by a post 242.

As best shown in FIGS. 9 and 10, a button 245 is integrally formed on an exterior surface of resilient loop 241 generally opposite connecting post 242 and generally adjacent to the widest horizontal portion of the oval-shaped loop. Although button 245 can take various forms without affecting the overall concept of the present invention, the button of the third preferred embodiment of the present invention generally is cross-shaped. A metal cap 246 having a generally curved or radiused outermost surface 247 and an annular flange 248 formed at its innermost end is friction fit on button 245 to increase the strength of the button. Annular flange 248 is curved to conform to the curvature of interior surface 50 of tube 24. A pair of opposed stops 250, 251 are integrally formed on opposed interior surfaces of loop 241 and disposed along generally the same horizontal plane as snap button 245. The operation of button 245, cap 246 and stops 250, 251 will be described in greater detail below in the description of the operation of snap bottom/anti-rattle member 240.

A support spacer 252 is integrally formed on the exterior surface of loop 241 generally opposite from and below the location of button 245. Post 242 also is integrally formed on the exterior surface of loop 241 opposite from but above button 245. Post 242 extends upwardly adjacent to loop 241 and is formed integrally with collar 243. Collar 243 is disposed above loop 241 and includes integrally formed horizontal generally planar cross-shaped upper section 255 and generally non-planar cross-shaped lower section 256. Upper planar section 255 is formed with cutouts 257 thereby defining the cross-shaped profile of the upper section, the importance of which is described in detail hereinbelow.

Snap button/anti-rattle member 240 of the third embodiment of the present invention is incorporated into an adjustable length telescopic structure, such as cane 10 shown in FIG. 1, in the following manner. Referring particularly to FIGS. 9 and 10, during assembly of cane 10 snap button/anti-rattle member 240 is friction fitted in open upper end 26 of inner tube 24. More specifically, the outer peripheral dimension of lower section 256 of collar 243 is substantially equal to the inner peripheral dimension of inner tube 24, and in combination with connecting post 242 and support spacer 252 which abut interior surface 50 of the inner tube, creates a tight friction fit of member 240 within the inner tube. Radially outwardly extending button 245 and cap 246, due to the outward biasing force of resilient loop 241, are urged through aligned opening 44 formed in inner tube 24 and through a selected aligned one of the plurality of openings 14 formed in outer tube 12 (FIG. 9) to hold the outer and inner tubes 12, 24, respectively, in locked relation to one another, as will be described in greater detail below in the description of the operation of member 240 in selectively adjusting the length of cane 10.

Upper planar section 255 of collar 243 has an outer peripheral dimension slightly greater than the outer peripheral dimension of inner tube 24 and substantially equal to the inner peripheral dimension of outer tube 12. Upper collar section 255 thus engages or abuts interior surface 48 of outer tube 12. Therefore, the frictional engagement between lower collar section 256, connecting post 242 and support spacer 252 with inner tube 24, in combination with the engagement between upper collar section 255 and outer tube 12, eliminates excessive play or rattle between the telescoping tubes. It should be noted that during assembly of cane 10, and in particular during seating of button/anti-rattle member 240 in inner tube 24, if member 240 is improperly seated, a tool having any suitable configuration, such as a thin wire hook or the like, can be inserted through a selected one of cutouts 257 of collar 243 to suitably engage any portion of member 240 for pulling the member out of its improper frictional fit within the inner tube. Member 240 then can be properly reseated in tube 24. Such a configuration of upper collar section 255 enabling quick insertion of a tool into inner tube 24 in the event of improper seating of member 240 therein is particularly useful in an assembly line situation. Without such an expedient method of removal of an improperly seated member 240 and proper reseating thereof, the assembly line would either have to be stopped until proper seating could be achieved, or the cane would have to be set aside for proper assembly at a later time. Both of these time-consuming options add unwanted cost to the manufacture of cane 10. In contrast, third embodiment member 240 of the present invention enables quick removal and reseating of the member within inner tube 24 without stopping the assembly line or otherwise delaying proper assembly of the cane until a later time.

Once properly seated in inner tube 24, and after slidable insertion of the inner tube in outer tube 12, integral snap button/anti-rattle member 240 of the third embodiment of the present invention operates in the following manner. When the length of cane 10 is desired to be adjusted, namely, either lengthened or shortened, button 245 is depressed radially inwardly through and beyond opening 14 of outer tube 12, as best shown in FIG. 10. More particularly, as button 245 is retracted by manually depressing the button inwardly against the outward bias of resilient loop 241, curved face 247 of metal button cap 246 facilitates easy passage of the button and cap beneath interior surface 48 of outer tube 12. Inner tube 24 then can be easily pushed or pulled in a lengthwise direction relative to outer tube 12 because curved outer surface 247 of metal button cap 246 easily slides beneath interior surface 48 of outer tube 12 until another of the plurality of outer tube openings 14 is aligned with inner tube opening 44 and button cap 246.

To prevent excessive depression of button 245, stops 250, 251 are provided and will contact each other, as best illustrated in FIG. 10, before curved outer surface 247 of metal button cap 246 retracts completely through inner tube opening 44 and beneath inner tube interior surface 50. Thus, stops 250, 251 prevent over stressing of the preferred plastic material used to form integral member 240. It is further understood that annular flange 248 of metal button cap 246 prevents excessive outward extension of button 245 through inner tube opening 44, which in turn facilitates positive locking of tubes 12, 24. More specifically, the complementary curvature of flange 248 to interior surface 50 of inner tube 24, together with the relatively small tolerances between the size of tube wall openings 14, 44 and the size of metal cap 246, ensures a secure locking of tubes 12, 24.

Integral snap button/anti-rattle member 240 of the third embodiment of the present invention preferably is formed of LEXAN® thermoplastic available from the General Electric Company.

It is understood that the third embodiment of the present invention provides several important advantages, in addition to those mentioned hereinabove. First, use of a resilient continuous loop 241 as the biasing means for button 245 eliminates relatively expensive coil springs. Moreover, the combination of collar 243, post 242, support spacer 252, and the radially outward bias of loop 241 maintains stable mounting of snap button/anti-rattle member 240 within inner tube 24, even if outer tube 12 is inadvertently and abruptly pulled off of inner tube 24. In addition, the tolerances of tubes 12, 24 relative to one another, as well as the tolerances between metal button cap 246 and tube openings 14 and 44, respectively, can be smaller due to the use of a continuous loop-type resilient biasing member. More specifically, in prior art non-loop non-continuous resilient biasing members, the portion of the biasing member to which a snap button is attached travels through an arc. Thus, larger tolerances, particularly in the tube openings, are required to ensure proper movement of the snap button into and out of the openings. Such larger tolerances themselves can add rattle to the telescoping tube assembly. Conversely, due to resilient continuous loop 241, together with post 242, support spacer 252 and lower collar section 256 which firmly abut interior surface 50 of tube 24, button 245 travels in a generally horizontal plane as indicated by double-ended arrow H shown in FIG. 9, thus eliminating the need for larger tolerances such as in tube openings 14, 44. Also, even if fatigue cracking occurs in plastic loop 241, such cracking will not adversely affect the operation of member 240 and in particular the consistent movement of button 245 in horizontal direction H.

Although a generally oval-shaped continuous loop is shown and described as the preferred resilient button biasing member 241 for the third embodiment of snap button/anti-rattle member 240 of the present invention, it is understood that the overall concept of the invention can be achieved using variations of the specified biasing member. More particularly, biasing member 241 can have shapes other than oval, such as diamond-shaped or round. Moreover, by varying the width and/or the thickness of member 241, the loop could be discontinuous or broken and still produce the desired movement of button 245 in a horizontal plane H.

While the preferred composition of the integral snap button/anti-rattle members 40, 140 and 240 is plastic or fiber reinforced plastic, it is appreciated that other materials may be used without departing from the scope and intent of the subject invention. Plastic is preferred because of the ease with which the member can be molded, i.e., the member formed as a continuous, homogeneous structure, as opposed to being formed as separate elements and subsequently combined. Additionally, the plastic has some resilient properties that are desired for close fit engagement as an anti-rattle device. Nevertheless, the invention need not be limited to the particular materials of construction.

The invention has been described with reference to the preferred embodiments. It will be understood, however, that the adjustable-length cane described herein is but one of many devices capable of using the integral snap button/anti-rattle member of the subject invention. Obviously, modifications and alterations will occur to others upon a reading and understanding of this specification. It is intended to include all such modifications and alterations insofar as they come within the scope of the appended claims or the equivalents thereof.

What is claimed is:

1. An integral snap button and anti-rattle collar member for receipt in first and second components, the member comprising:

a body adapted for receipt in the first component, the body having a tab partially separated from the remainder of the body and adapted for limited flexing movement;

a snap button extending outwardly from the tab for selectively securing the first and second components against relative movement;

a collar formed on the body, the collar having an outer peripheral dimension generally adapted to be larger than the outer peripheral dimension of the body, the collar being discontinuous along a peripheral portion therein, the collar adapted for receipt in the second component for eliminating rattle between the first and second components; and a spring in engagement with the tab.

2. The member as defined in claim 1 further comprising a cutout in the body on a side of the tab allowing flexing of the tab.

3. The member as defined in claim 1 further comprising a metal cap received over the snap button.

4. An adjustable-length support assembly comprising:

a first component having at least a pair of openings therein;

a second component having an opening therein, the second component being operatively received in the first component and being selectively movable relative thereto;

an integral anti-rattle and snap button member received in the first and second components, a first portion of the member closely, but slidably, engaging the first component and a second portion of the member secured to the second component, the member including a snap button extending outwardly through the second component opening and disposed for selective receipt through any one of the openings of the first component when aligned over the second component opening whereby the first and second components are locked against further relative movement, said member further comprising a flexible tab defined for selective depression inward when the snap button is depressed whereby the first and second components may be moved relative to one another until one of the openings in the first component is aligned with the second component opening, and wherein said tab is partially separated from the remainder of the member by a pair of cutouts on either side of the tab.

5. The assembly as defined in claim 4 wherein the member is formed primarily of plastic.

6. The assembly as defined in claim 4 further comprising a metal cap received over the snap button.

7. The assembly as defined in claim 4 wherein the first portion of the member includes an enlarged diameter collar for receipt in the first component and being dimensioned to prevent insertion into the second component.

8. The assembly as defined in claim 7 wherein the collar is not circumferentially continuous.

9. The assembly as defined in claim 4 wherein the cutouts are generally V-shaped and extend along opposite edges of the tab.

10. A selectively-extendable leg of a medical patient aid device comprising:

a first tubular component adapted for extension from an associated patient aid device;

a second tubular component dimensioned for sliding telescoping receipt with the first tubular component whereby the combined length of the first and second tubular components may be selectively altered;

an opening in the first tubular component and plural openings in the second tubular component which may be selectively aligned with the opening in the first tubular component;

an integral anti-rattle and snap button member received in the first tubular component comprising; (i) a snap button portion that extends through the opening in the first tubular component and is adapted to extend through any one of the plural openings in the second tubular component when aligned therewith to lock the tubular components against relative movement, (ii) a collar portion closely received in the second tubular component to eliminate rattle between the telescoping tubular components, and (iii) a flexible tab that carries said snap button portion and flexes generally transversely inward upon depression of said snap button to allow the combined length of said tubular components to be selectively altered.

11. The device as defined in claim 10 wherein the tab is separated from the remainder of the member by a pair of recesses disposed on opposite sides of the snap button portion.

12. The device as defined in claim 10 wherein the member is formed primarily of plastic.

13. The device as defined in claim 12 wherein the member includes a metal cap received over the snap button portion.

14. An integral locking and anti-rattle member for insertion in at least first and second telescopically mated tubes, said first tube having a tube wall and at least one open end, the first tube further being formed with a tube wall opening, said second tube having a tube wall and at least one open end, the second tube further being formed with at least one tube wall opening, said first tube open end being slidably received in said second tube open end, said locking and anti-rattle member including:

a) a resilient substantially closed loop-shaped member having an exterior surface and an interior surface;

b) a collar connected to said loop-shaped member, said collar comprising:

i) a portion distal from said loop-shaped member, said distal portion having an outer peripheral dimension adapted to be greater than an outer peripheral dimension of said first tube and adapted to be substantially equal to an inner peripheral dimension of said second tube;

ii) a portion proximal to said loop-shaped member, said proximal portion having an outer peripheral dimension adapted to be substantially equal to an inner peripheral dimension of said first tube; and c) a button formed on said exterior surface of said loop-shaped member, so that upon insertion of the loop-shaped member and said proximal collar portion in said first tube open end and alignment of said button with said first tube wall opening, and further upon sliding said second tube over the first tube and alignment of said second tube wall opening with said first tube wall opening, said resilient loop-shaped member biases the button in an outward direction through said aligned tube wall openings to lock said tubes against relative movement.

15. The integral locking and anti-rattle member of claim 14, in which the loop-shaped member is continuous; and in which said button moves in substantially a horizontal plane.

16. The integral locking and anti-rattle member of claim 15, in which the loop-shaped member is oval-shaped.

17. The integral locking and anti-rattle member of claim 14, in which a support spacer is integrally formed on said exterior surface of said loop-shaped member opposite from and below said button; and in which said support spacer is adapted to abut said first tube wall.

18. The integral locking and anti-rattle member of claim 17, in which a post connects said loop-shaped member and said collar; in which a lower end of said post is integrally formed with said exterior surface of said loop-shaped member opposite from and above said button; in which a second end of the post is integrally formed with said collar; and in which said post is adapted to abut said first tube wall.

19. The integral locking and anti-rattle member of claim 14, in which a pair of stops is integrally formed on the interior surface of said loop-shaped member in opposed relationship; and in which said pair of stops are disposed substantially in horizontal alignment with said button.

20. The integral locking and anti-rattle member of claim 14, in which a metal cap is disposed on said button; and in which an outer surface of said cap is formed with a radius.

21. Tile integral locking and anti-rattle member of claim 20, in which a flange is formed on an inner end of said cap adapted to contact said first tube wall to limit the outward radial movement of said button within said first tube; and in which said flange has a curvature complementary to a curvature of the first tube wall.

22. The integral locking and anti-rattle member of claim 20, in which said button is cross-shaped; and in which said metal cap is friction fit on said cross-shaped button.

23. The integral locking and anti-rattle member of claim 14, in which said distal collar portion is substantially horizontally disposed and planar; in which the distal collar portion is formed with cutouts and is cross-shaped; in which said proximal collar portion is non-planar and cross-shaped; and in which said distal collar portion cutouts provide access within said first tube for insertion of a tool for removal of said locking and anti-rattle member from the first tube.

24. The integral locking and anti-rattle member of claim 14, in which said locking and anti-rattle member is formed of plastic.

25. The integral locking and anti-rattle member of claim 14, in which said second tube is formed with a plurality of openings disposed longitudinally along said tube wall; and in which each of said second tube wall openings is selectively alignable with said first tube wall opening for selectively adjusting the length of said telescopically mated first and second tubes.

26. The integral locking and anti-rattle member of claim 14, in which said locking and anti-rattle member is incorporated in adjustable length human support devices; and in which said first and second tube walls are free of direct contact with each other.

27. An integral anti-rattle member for selectively locking inner and outer adjustable mated tubes said member comprising:
  a) a resilient, loop-shaped member, said loop-shaped member having an interior and an exterior surface;
  b) a button, said button located on said exterior surface of said loop-shaped member, said button extending outwardly and adapted for engagement with an opening in said inner tube and adapted for receipt with at least one opening in said outer tube for selectively securing said inner tube and said outer tube against relative movement with respect to each other; and
  c) a collar connected to said loop-shaped member, said collar comprising:
    an upper section, said upper section having an outer peripheral dimension adapted to be slightly greater than an outer peripheral dimension of said inner tube; and
    a lower section, said lower section having an outer peripheral dimension adapted to be substantially equal to the inner peripheral dimension of said inner tube.

28. The integral anti-rattle member of claim 27, wherein said loop-shaped member is adapted to be operatively located within said inner tube.

29. A human support device comprising the integral anti-rattle member of claim 28.

30. The human support device of claim 29, wherein said human support device is a cane, crutch, walker, adjustable height chair or commode.

31. The integral anti-rattle member of claim 28, wherein said loop-shaped member is continuous, and wherein said button moves in a substantially horizontal plane.

32. The integral anti-rattle member of claim 27, wherein said loop-shaped member is oval-shaped.

33. The integral anti-rattle member of claim 27, wherein a metal cap is disposed on said button, and wherein said anti-rattle member is formed of plastic.

* * * * *